March 11, 1924.
D. G. MORRISON
CONVEYER
Filed Nov. 18, 1922    2 Sheets-Sheet 1
1,486,839
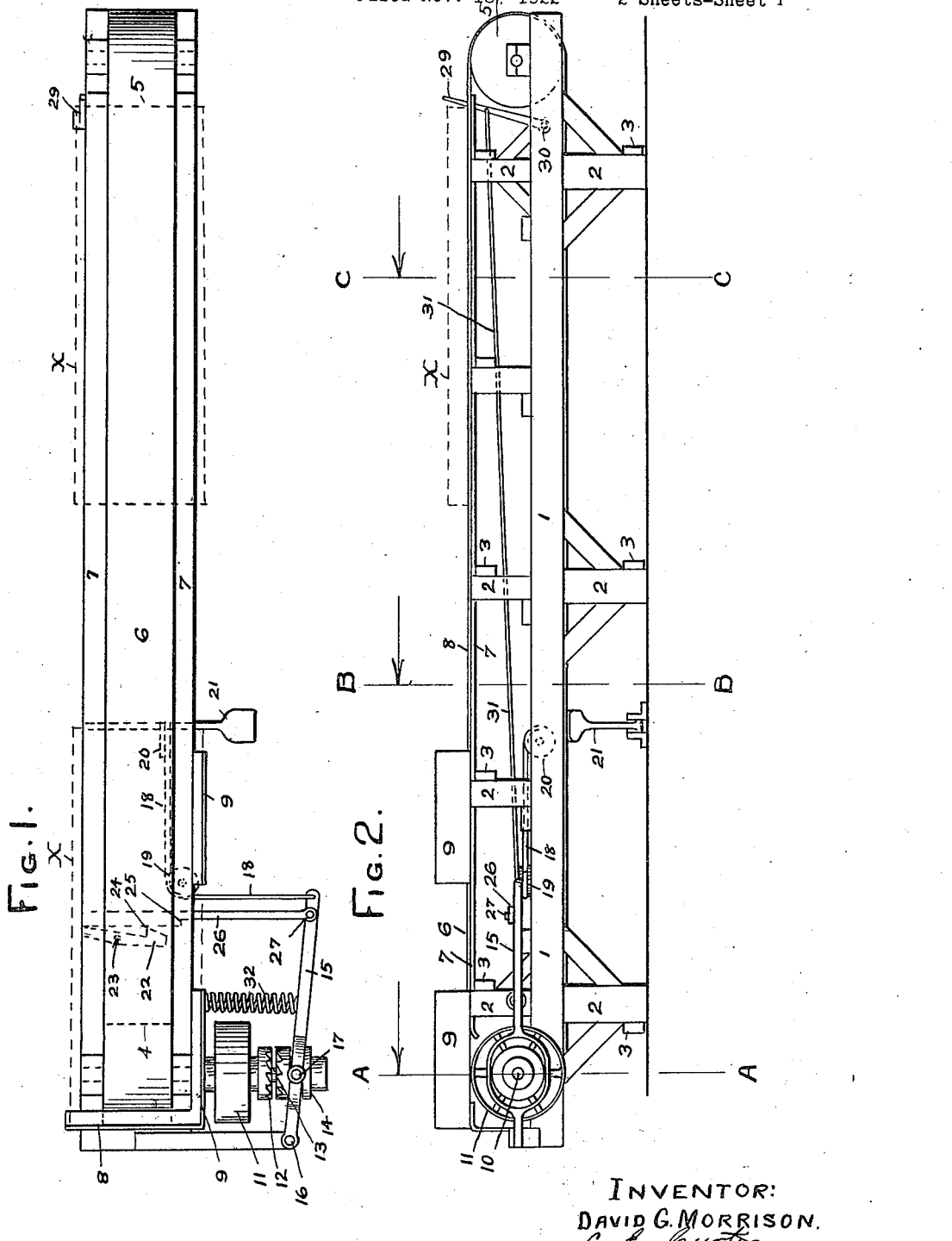
INVENTOR:
DAVID G. MORRISON.
BY
HIS ATT'Y.

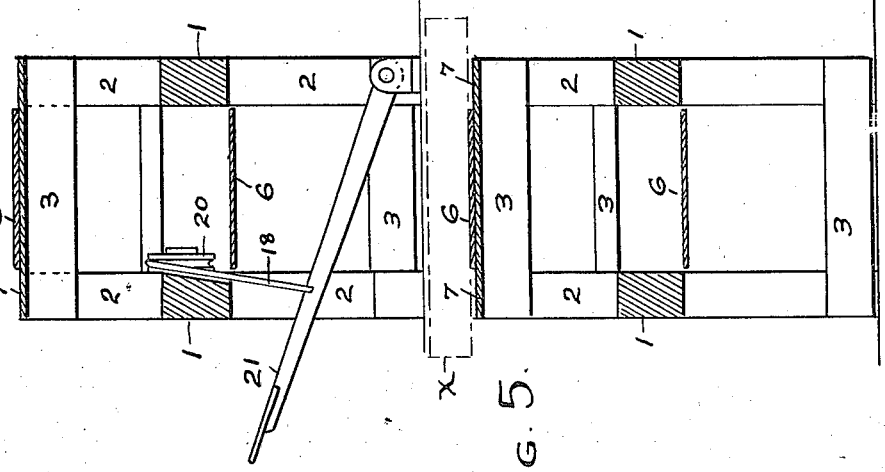
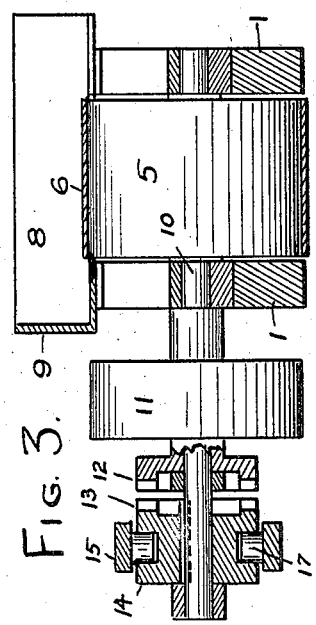
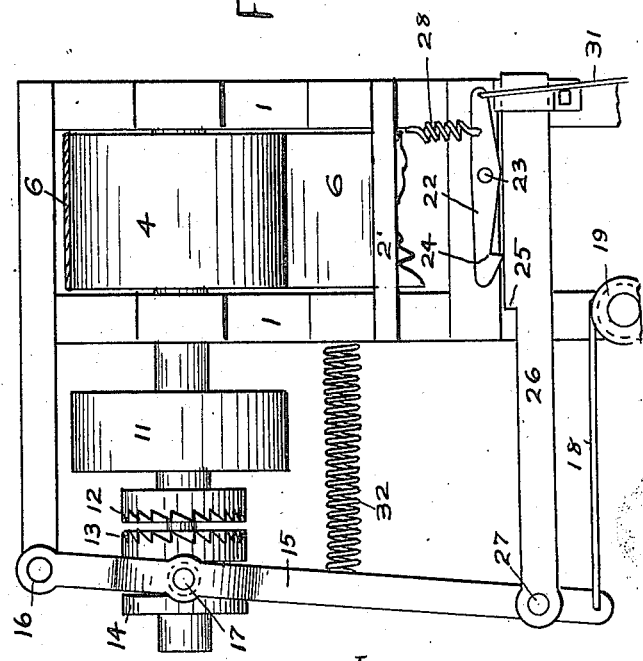

Patented Mar. 11, 1924.

1,486,839

UNITED STATES PATENT OFFICE.

DAVID G. MORRISON, OF WARREN, OHIO.

CONVEYER.

Application filed November 18, 1922. Serial No. 601,709.

*To all whom it may concern:*

Be it known that I, DAVID G. MORRISON, a citizen of the United States, residing at Warren, in the county of Trumbull and State of Ohio, have invented a new and useful Improvement in Conveyers, of which the following is a specification.

This invention relates to conveying mechanism and more particularly to the conveying machine wherein the conveyer acts intermittently and preferably under the control of the operator or attendant.

The main object of my invention is to provide means whereby a plurality of articles may be assembled one upon the other and properly positioned for tying together or bundling and then conveyed bodily to another station where the bundling operation may be performed while a new stack or bundle is being accumulated at the receiving station of the machine.

Another object of the invention is to provide a machine of simple, cheap and durable construction, easy to operate and one in which the assembling and tying of the sheets together into the form of a bundle can be performed with the least amount of labor. The invention will be more fully understood by referring to the accompanying drawings forming a part of this specification and in which like numerals indicate like parts throughout the several figures and in which Figure 1 is a plan view of the machine embodying my invention. Fig. 2, a side elevation. Figs. 3, 4 and 5 are sections on line AA, BB and CC of Fig. 2. Fig. 6 is a detailed plan view of the clutch operated mechanism.

In the drawing 1 represents the longitudinal frame members, 2 the vertical members and 3 the cross members or cross or tying members composing the frame of the device. At each end of the longitudinal members 1 are journaled pulleys 4 and 5 over which the conveyer belt 6 passes; 7 is a platform or top portion of the frame member for supporting the upper ply of the belt 6; 8 and 9 are end and side gauges for properly positioning the articles to be bundled (such as metal lath) upon the conveyer belt 6. It will be observed that the conveyer belt 6 and the frame work including the support 7 are of less width than the sheets of metal lath to be bundled, thus allowing the lath to project at both sides of the apparatus so that the wires for tying the sheets together may be readily passed through the interstices of the lath. The shaft 10 of the pulley 4 carries a driving pulley 11 mounted so as to revolve thereon and said pulley 11 carries a clutch member 12 which is engaged by the clutch surface 13 on the slide clutch member 14 for the purpose of driving the conveyer. The sliding clutch member 14 is splined to the shaft so as to rotate with it but is free to slide thereon into engagement with the clutch surface 12 carried by the driving pulley 11. The sliding clutch member 14 is thrown into engagement with clutch 12 by means of a lever 15 pivoted at 16 to the frame of the machine and at 17 to the clutch member and at its end is atached a cable 18 passing over pulleys 19 and 20 upon the frame of the machine to a foot treadle 21 which is located in a position convenient for the operator. This lever 15 is held in its inward or operating position so as to hold the clutch members together by means of a pawl or detent 22 pivoted at 23 to the frame of the machine and having a projection 24 for engaging the notch 25 upon the slide 26 pivoted to the lever 15 at 27. The detent is held in position by a spring 28 and is withdrawn by the contact of the bundle X shown in dotted lines in Figure 2 of the drawing with the lever 29 pivoted at 30 upon the frame of the machine and connected to the detent 22 by means of a rod or connection 31. 32 is a spring for returning the lever 15 to its normal position when the slide is released by the pawl or detent 22.

The operation of the device is as follows:

Sheets of metal lath being delivered to the proper position relative to the conveyer are taken one by one by the operator and placed upon the conveyer at the receiving end of the machine and properly positioned by the gauges which are so positioned as to allow the lath to project beyond the sides of the apparatus. When a sufficient number of sheets have been accumulated in a bundle the conveyer is set in operation by the operator pressing down upon the foot treadle 21, thereby bringing the clutch members 12 and 13 together and driving the conveyer through the pulley 4.

When the bundle has traveled to the delivery end of the apparatus it comes into contact with the lever 29 and forces the lever in the direction of the travel of the bundle until it has gone far enough to release the detent 22, when the spring 32 returns lever 15 to its normal position and stops the conveyer.

While the conveyer is in its stationary position the operation of receiving sheets of lath to form another bundle is repeated. The bundle previously delivered to the delivery end of the machine is wired together by attendents passing wires through the interstices of the lath and twisting the ends together.

While I have shown a device for carrying out my invention it will be readily understood that the details may be varied very considerably without departing from my invention.

What I claim is:—

1. In an apparatus of the class described, the combination of suitable frame work, a carrier mounted thereon adapted for intermittent operation and of less width than the article to be conveyed, with means for positioning sheets upon the conveyer and mechanism for operating the conveyer.

2. In an apparatus of the class described, the combination of suitable frame work, a carrier mounted thereon adapted for intermittent operation and of less width than the article to be conveyed, with means of positioning sheets upon the conveyer and mechanism for operating the conveyer, and automatic stopping mechanism located at the delivery end of the machine.

3. A conveyer of the class described consisting of a suitable frame, a conveyer mounted thereon of less width than the article to be conveyed and adapted to be operated intermittently, clutching mechanism for starting the conveyer automatic stopping mechanism for stopping the conveyer and gauges for positioning the articles upon the conveyer.

DAVID G. MORRISON.